(No Model.)
J. GAMBLLEE & J. F. HARING.
VEHICLE AXLE.
No. 267,872. Patented Nov. 21, 1882.
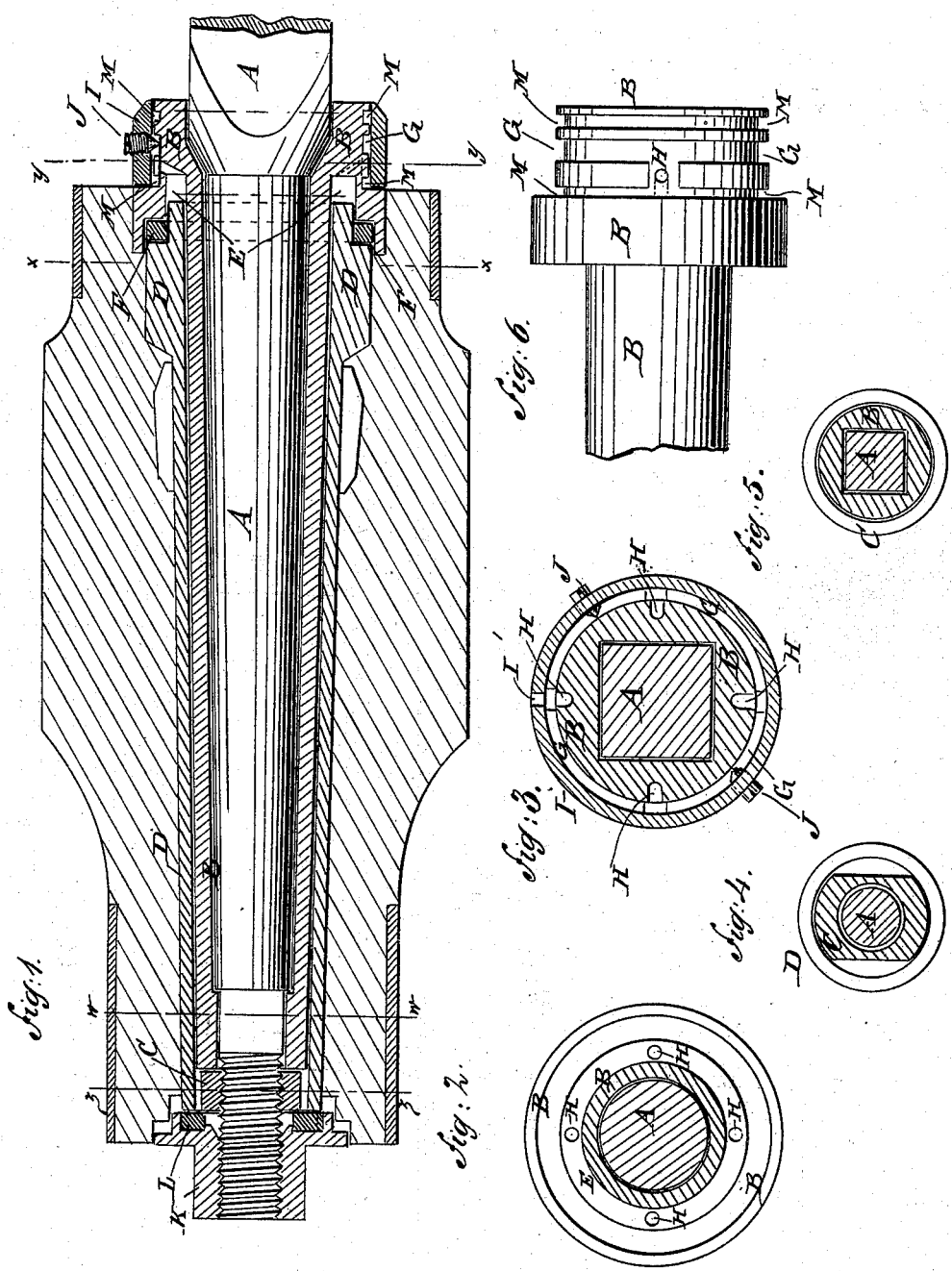
WITNESSES:
INVENTOR:
BY
ATTORNEYS.

UNITED STATES PATENT OFFICE.

JEULEOS GAMBLLEE AND JOHN F. HARING, OF CRESSKILL, NEW JERSEY.

VEHICLE-AXLE.

SPECIFICATION forming part of Letters Patent No. 267,872, dated November 21, 1882.

Application filed July 26, 1882. (No model.)

*To all whom it may concern:*

Be it known that we, JEULEOS GAMBLLEE and JOHN F. HARING, of Cresskill, in the county of Bergen and State of New Jersey, have invented a new and useful Improvement in Vehicle-Axles, of which the following is a full, clear, and exact description.

Reference is to be had to the accompanying drawings, forming part of this specification, in which similar letters of reference indicate corresponding parts in all the figures.

Figure 1 is a sectional side elevation of our improvement. Fig. 2 is a sectional end elevation of the same, taken through the line $xx$, Fig. 1, and looking to the right. Fig. 3 is a sectional end elevation of the same, taken through the line $yy$, Fig. 1, and looking to the left. Fig. 4 is a sectional end elevation of the same, taken through the line $zz$, Fig. 1. Fig. 5 is a sectional end elevation of the same, taken through the line $ww$, Fig. 1. Fig. 6 is a side elevation of the inner end of the adjustable bushing.

The object of this invention is to increase the durability of vehicle-axles, and facilitate the repairing of the said axles when worn.

The invention consists in a vehicle-axle constructed with an adjustable bushing secured in place by a tubular nut, and provided with grooves and passages to receive oil, and an adjustable band provided with set-screws and oil-hole, whereby the bushing can be adjusted as each side becomes worn, and can be readily supplied with oil, as will be hereinafter fully described.

A represents an axle, the body of which is made square, and its arm or journal is made round and tapered, and has a screw-thread upon its end, in the ordinary manner. The shoulder of the axle A, where it passes from a square to a round form, is rounded, as shown in Fig. 1, for convenience in casting the bushing B. The bushing B is cast with the interior of such shape and size as to fit upon the journal of the axle and the outer end of the square part of the said axle, so that the said bushing cannot turn upon the axle.

To prevent the forward end of the bushing B from turning upon the journal of the axle A, the forward part of the said axle at the base of its screw-thread is made square, and the inner surface of the forward end of the bushing is made square to fit upon it, as shown in Figs. 1 and 5, so that it will be impossible for the bushing to be twisted, and thus injured should it heat and bind in the thimble-skein.

The bushing B is made shorter than the arm of the axle A, and is kept in place by a tubular nut, C, which is flattened upon its opposite sides to allow it to be readily screwed on and off, as shown in Fig. 4. The bushing B and nut C are made of such a length that the outer end of the said nut will be flush with the outer end of the thimble-skein D, which fits upon the bushing B, and is designed to be secured to the hub of the wheel in the ordinary manner.

The inner end of the bushing B is enlarged, to serve as a collar to the axle, and has a ring-groove, E, formed in the shoulder to receive the rabbeted end of the thimble-skein D, and is rabbeted so as to overlap the end of the thimble-skein, as shown in Fig. 1. The rabbeted end of the skein D does not extend to the bottom of the groove E, as shown in Fig. 1, so that the inner part of the said groove may serve as an oil-reservoir.

If desired, a leather washer, F, can be interposed between the shoulders of the bushing B and skein D, to prevent oil from escaping and to lessen the friction between the said shoulders.

In the outer surface of the inner part of the bushing B is formed an annular groove, G, to serve as an oil-reservoir, and from the forward side of which holes H are formed, leading from the bottom of the groove G to the bottom of the groove E, to serve as passages for the oil. The groove G is covered by a band, I, which is kept in place by two conical pointed set-screws, J, which pass through the said band I, enter the groove G, and rest against the bottom of the said groove, the conical shape of the points of the screws J preventing them from obstructing the passage of oil through the said groove G. The holes H are formed directly opposite the centers of the flat sides of the axle A, so that whichever side of the bushing B be upward one of the holes H will also be upward, so that oil can be poured into it through a hole, I', in the band I, which is formed in such a position that when turned to either side of the hole H it will be over a solid part of the bushing B, so that oil cannot escape through it. The band I can be readily turned by loosening the set-screws.

In the outer surface of the end part of the bushing B, upon the opposite sides of the grooves G, are formed grooves M, as shown in Figs. 1 and 6, to receive packing to prevent oil from escaping between the band I and the said bushing, and thus make the oil-reservoir oil-tight. With this construction, when the lower side of the bushing B becomes worn, the said bushing can be removed, turned one-half or one-quarter around, and replaced, so that the wear will come in a new place. When all four sides of the bushing B become worn the said bushing can be thrown to one side and replaced by a new bushing at a trifling cost, the journal of the axle being always protected from wear.

The skein D, and with it the hub of the wheel, are kept in place upon the bushing B by a cap-nut, K, and the escape of oil is prevented by a leather washer, L, kept in place by the said nut K.

We are aware that it is not new to use a detachable replaceable bush or sleeve within an axle-box; but What we do claim as new is—

1. The combination of an end-threaded axle, A, a thimble-skein, D, a bushing, B, an end nut, K, a washer, L, and an oppositely-flattened tubular nut, C, the thimble-skein being shorter than the axle and the bushing being shorter than the thimble-skein, as shown and described.

2. A vehicle-axle constructed substantially as herein shown and described, and consisting of the axle A, adjustable bushing B, having grooves E G and passages H, the adjustable band I, having set-screws J and oil-hole I', and the tubular nut C, as set forth.

3. In a vehicle-axle, the combination, with the bushing B, having groove E, of the thimble-skein D, having rabbeted inner end, substantially as herein shown and described, whereby the said groove is made to serve as an oil-reservoir, as set forth.

4. In a vehicle-axle, the combination, with the bushing B, having grooves E G and passages H, of the adjustable band I, having oil-hole I' and set-screws J, substantially as herein shown and described, whereby the said bushing can be readily supplied with oil, and the escape of oil will be prevented, as set forth.

JEULEOS GAMBLLEE.
JOHN F. HARING.

Witnesses:
JAMES T. GRAHAM,
C. SEDGWICK.